United States Patent [19]

Kruse et al.

[11] Patent Number: 4,617,167

[45] Date of Patent: Oct. 14, 1986

[54] UNDERWATER RADIATION DETECTOR

[75] Inventors: Lyle W. Kruse; Richard P. McKnight, both of Albuquerque, N. Mex.

[73] Assignee: The United States of America as represented by the United States Department of Energy, Washington, D.C.

[21] Appl. No.: 586,620

[22] Filed: Mar. 6, 1984

[51] Int. Cl.[4] .......................................... G21C 17/00
[52] U.S. Cl. ................................. 376/153; 376/254; 376/255; 250/374; 250/392
[58] Field of Search .................. 376/153, 254, 255; 250/390–392, 374

[56] References Cited

U.S. PATENT DOCUMENTS

| 2,534,932 | 12/1950 | Sun | 376/153 |
|---|---|---|---|
| 2,733,355 | 1/1956 | McKee | 376/153 |
| 2,740,898 | 4/1956 | Youmans | 376/153 |
| 3,067,329 | 12/1962 | Linden | 376/153 |
| 3,566,118 | 2/1971 | Peters | 250/390 R |
| 3,588,505 | 6/1971 | Johnson, Jr. | 376/153 |
| 3,786,253 | 1/1974 | Haffner et al. | 250/390 R |
| 3,902,092 | 8/1975 | Clark | 250/374 |
| 3,988,586 | 10/1976 | Stuart et al. | 250/390 |
| 4,200,491 | 4/1980 | Ball | 376/254 |
| 4,260,892 | 4/1981 | Kovacs et al. | 250/374 |
| 4,271,361 | 6/1981 | Jacobs | 250/390 R |

OTHER PUBLICATIONS

LA-3498-MS (7/14/66) "The Silver Counter: A Detector for Neutron Bursts", Lanter et al.

Primary Examiner—Salvatore Cangialosi
Attorney, Agent, or Firm—George H. Libman; Albert Sopp; Judson R. Hightower

[57] ABSTRACT

A detector apparatus for differentiating between gamma and neutron radiation is provided. The detector includes a pair of differentially shielded Geiger-Mueller tubes. The first tube is wrapped in silver foil and the second tube is wrapped in lead foil. Both the silver and lead foils allow the passage of gamma rays at a constant rate in a gamma ray only field. When neutrons are present, however, the silver activates and emits beta radiation that is also detected by the silver wrapped Geiger-Mueller tube while the radiation detected by the lead wrapped Geiger-Mueller tube remains constant. The amount of radiation impinging on the separate Geiger-Mueller tubes is then correlated in order to distinguish between the neutron and gamma radiations.

9 Claims, 1 Drawing Figure

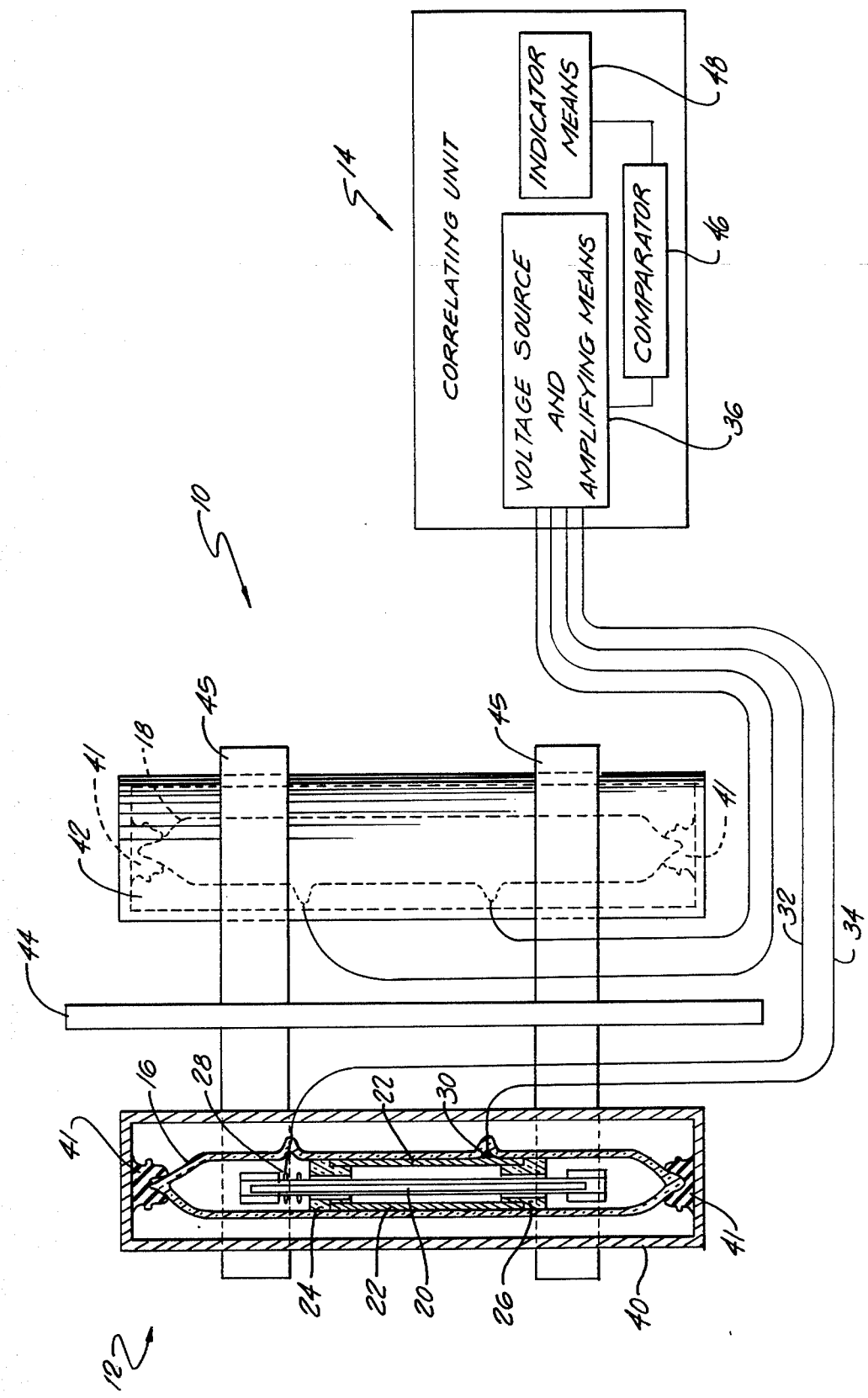

UNDERWATER RADIATION DETECTOR

"The U.S. Government has rights in this invention pursuant to Contract No. DE-AC04-76DP00789 between the U.S. Department of Energy and AT&T Technologies, Inc."

BACKGROUND OF THE INVENTION

The present invention relates generally to the radiation detection field and, more particularly, to a radiation detection method and apparatus capable of distinguishing between neutron and gamma radiations.

It is often desirable or necessary to simultaneously monitor neutron and gamma radiation. For example, spent reactor fuel emits neutrons while other radioactive waste does not. Consequently, the movement of spent reactor fuel within an underwater fuel basin may be monitored by sensing or detecting the presence of neutrons. A problem arises, however, in that it is difficult to detect neutrons in the presence of an associated large flux of gamma rays as, for example, emitted by the spent fuel and other radioactive wastes in the fuel basin.

In an effort to overcome this problem, several detection mechanisms have been proposed involving scintillation. Gamma rays and neutrons that reach a scintillation detector produce flashes of light as they lose their energy through nuclear reactions in the scintillator. The light flashes due to the neutrons may be distinguished from those due to the gamma rays by the shape of the output.

Examples of such scintillation detectors are found in U.S. Pat. Nos. 3,566,118 to Peters, 3,786,253 to Haftner et al and 3,988,586 to Stewart et al. While such scintillator devices are capable of providing reasonably accurate neutron and gamma ray readings, they are not without their disadvantages.

Each of the devices requires the use of photomultiplier tubes for counting the pulses or flashes of light created by the neutrons or gamma rays impinging upon the scintillator. Disadvantageously, these photomultiplier tubes are quite expensive. Further, as the flux of gamma rays increases, the efficiency and ability of the photomultiplier tubes in distinguishing between the pulses or flashes created by the neutrons and gamma rays in the scintillator is greatly reduced.

Thus, a need is identified for an improved method and apparatus for distinguishing between neutrons and gamma rays. More particularly, a need is identified for a method and apparatus that is less expensive while providing improved efficiency and distinguishing ability.

SUMMARY OF THE INVENTION

Accordingly, it is a primary object of the present invention to provide a method and apparatus overcoming the above described limitations and disadvantages of the prior art.

Another object of the present invention is to provide an improved method and detection apparatus for distinguishing between neutrons and gamma rays that is less expensive.

A further object of the present invention is to provide an improved method and apparatus that operates more efficiently and reliably to furnish improved capability in distinguishing between neutrons and gamma rays.

Still another object of the present invention is to provide an improved method and apparatus for distinguishing between neutron and gamma radiation so as to allow the monitoring or tracking of spent reactor fuel movement in an underwater fuel basin.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus and method are provided for distinguishing between neutrons and gamma-rays. The improved detecting apparatus includes a transducer unit having first and second sensing means for detecting gamma radiation. A first shielding means is provided for shielding the first sensing means and a second shielding means is provided for shielding the second sensing means. The first and second shielding means allow the passage of gamma-rays at a constant rate in a gamma-ray only field. Therefore, a relation exists between the gamma ray signals of the first and second sensing means. When neutrons are present, the first shielding means activates and emits beta radiation. This beta radiation is detected by the first sensing means but not the second sensing means.

Means are provided for correlating the signals indicating the difference in the amount of radiation impinging on the first and second sensing means. That is, the correlating means cancels the gamma radiation signal from the first sensing means by subtracting the gamma ray signal of the second sensing means in accordance with the above relation. Any remaining signal of the first sensing means is caused by the detection of beta radiation. Since the beta radiation is only emitted in the event of neutron activation of the first shielding means, a beta signal indicates the presence of neutrons in the gamma ray field, and in turn the presence of spent reactor fuel.

More specifically, the first and second sensing means of the transducer unit are of the Geiger-Mueller type as, for example, disclosed in U.S. Pat. No. 3,902,092 to Clark. Further, the first and second shielding means are dissimilar metallic foils enclosing and surrounding the first and second Geiger-Mueller tubes (hereinafter G-M tubes).

Preferably, the first shielding means comprises silver foil that activates under the influence of neutrons to emit beta radiation. The emitted beta radiation is then detected by the first G-M tube disposed within the silver foil. The second shielding means comprises lead foil. Both the lead and silver foils are preferably substantially 10 millimeters thick. As is known in the art, lead and silver foils of substantially the same thickness do not provide the same amount of shielding. The lead foil provides greater shielding so that the gamma ray count or signal from the second G-M tube is always slightly less than the gamma ray count or signal from the first G-M tube. A subtraction or differential signal may be obtained by subtracting the signal of the second G-M tube from the signal of the first G-M tube. The subtraction signal is always a positive value that remains constant in a gamma ray only field.

When neutrons are present, however, the silver foil activates and emits beta radiation that is detected and counted by the first G-M tube. The dramatically increased signal of the silver shielded first G-M tube proportionally increases the subtraction signal, thereby indicating the presence of neutrons in the gamma ray field, and thus the spent fuel.

Silver is the preferred material for shielding the first G-M tube as the activation and beta ray emission caused by the impinging neutrons is only evident for approximately 10 minutes after the neutron source is removed. After that amount of time, beta ray emission ceases. Thus, advantageously, the relatively short half-life of the activated silver allows reliable monitoring of fuel movements within a water filled basin at short intervals of time. This is particularly important where spent fuel is being moved from a storage basin to a reprocessing plant in multiple passes, each pass occurring, for example at half hour intervals. In such a situation, a material exhibiting a half life longer than the activated silver may still be emitting beta radiation and not have returned to base line level in time to provide an accurate reading as to the spent fuel movements of the following pass.

In order to further insure accurate radiation readings and neutron detection by the transducer unit, it is preferred to support the first and second G-M tubes in adjacent positions on opposite sides of a third shielding means such as an aluminum plate. Even though beta radiation is of insufficient energy to travel great distances, the aluminum plate further shields and prevents any beta radiation emitted from the activated silver foil from being detected by the second, lead shielded G-M tube. Advantageously, the aluminum plate also exhibits excellent corrosion resistance. If desired, a series of detectors in accordance with the present invention are located all along an underwater fuel basin to indicate the movement of spent reactor fuel.

In a further aspect of the invention, in accordance with its objects and purposes, a method for distinguishing between neutron and gamma radiation includes the steps of shielding a first sensing means with a material that activates under the influence of neutrons to emit beta radiation. The next step involves sensing the presence of gamma and beta radiation with the first sensing means or G-M tube discussed above. A second G-M tube is then used in sensing the presence of gamma radiation only. The final step of the method requires correlating the amount of radiation impinging on the first and second G-M tubes so as to cancel the common gamma ray signal of the first G-M tube. Any remaining signal is the result of beta radiation. This beta radiation indicates the presence of neutrons in the gamma ray field emitted by spent fuel.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The single figure of the accompanying drawing incorporated in and forming a part of the specification, illustrates the several aspects of the present invention and together with the description serves to explain the principles of the invention. The figure is a schematic representation of an improved detection apparatus according to the present invention for distinguishing between neutrons and gamma rays so as to indicate the presence of neutrons in a gamma ray field.

Reference will now be made in detail to the present preferred embodiment of the invention, an example of which is illustrated in the accompanying drawing.

DETAILED DESCRIPTION OF THE INVENTION

Reference is now made to the drawing showing an improved detecting apparatus 10 for indicating the presence of neutrons in a gamma ray field. The apparatus 10 has particular application as a reliable radiation monitor and detector for spent reactor fuel in underwater fuel basins based upon the principle that nuclear waste does not emit neutrons while spent reactor fuel does. The apparatus has the ability to sense the presence of the neutrons in a moving radiation source also having a large flux of gamma rays. Several transducers of the detection apparatus of the present invention may be located at various points in the fuel basin and used to monitor or track the movement of spent reactor fuel from a storage basin into the reprocess cycle at a reprocessing plant. It should be recognized, however, that the apparatus 10 of the present invention has other uses and that the broader aspects of the invention are not limited to the particular application described above.

The apparatus 10 includes a transducer unit, generally designated by reference numeral 12 and a correlating unit, generally designated by reference numeral 14. The transducer unit 12 includes two separate sensing means 16, 18, such as G-M tubes. G-M tube 16 as is known in the art, includes an anode 20 suspended longitudinally within a cathode shell 22 by means of insulators 24, 26. The tube is partially evacuated and contains a quenching gas. Electrical contact is made to the anode 20 at terminal 28 and to the cathode 22 at terminal 30. As shown, the terminals 28, 30 are connected by means of wires 32, 34 to a conventional voltage source and amplifying means 36 of correlating unit 14. Of course, it should be appreciated that the description of G-M tube 16 is equally applicable to G-M tube 18. It is only for purposes of simplification that only one of the two G-M tubes 16, 18 is described in detail.

The first G-M tube 16 is shielded or enclosed by means of silver foil 40. As shown, the foil 40 may be in the shape of a closed-end cylindrical envelope and includes rubber mounting posts 41 for retaining the G-M tube 16 in proper position. The second G-M tube 18 is shielded or enclosed by means of lead foil 42. The lead foil 42 may also take the shape of a closed-end cylindrical envelope and includes rubber mounting posts 41 for retaining G-M tube 18 in proper position. The silver shielded G-M tube 16 and the lead shielded G-M tube 18 are rigidly mounted in adjacent positions on opposite sides of aluminum plate 44 by means of clamps or brackets 45. The function of the shielding aluminum plate 44 will be discussed below.

Silver and lead foils 40, 42 of substantially 10 mil thickness have been found to provide an appropriate balance between shielding and sensitivity, as, for example, where the respectively shielded G-M tubes 16, 18 are being used to monitor or track spent reactor fuel movement in an underwater fuel basin. Both the silver and lead foil shields 40, 42 allow the passage of gamma rays to the respective G-M tubes 16, 18. The lead foil, however, provides greater shielding so that the gamma ray count or signal of the lead shielded G-M tube 18 is always slightly less than the gamma ray count or signal of the silver shielded G-M tube 16.

Correlating unit 14 includes a comparator 46 for processing the amplified signals of the two G-M tubes 16, 18 to obtain a subtraction or differential signal. The subtraction signal is equivalent to the signal of the silver shielded G-M tube 16 minus the signal of the lead shielded G-M tube 18. Since the lead foil 42 provides greater shielding than the silver foil 40, the subtraction signal always leads to a positive value. Further, this value remains constant in a gamma ray only field.

This, however, is not true when neutrons are present within the gamma ray field. While the neutrons have no effect on the gamma ray shielding properties of silver and lead foils 40, 42, they do activate the silver foil. Once activated, the silver foil 40 begins to emit beta radiation. This beta radiation is detected and counted on the silver shielded G-M tube 16. The beta radiation, however, is relatively low in energy and is not counted or detected by the lead shielded G-M tube 18. This fact is further insured by the presence of the aluminum plate 44 disposed between the silver shielded G-M tube 16 and the lead shielded G-M tube 18 to provide even further shielding of the beta radiation from the lead shielded tube.

Consequently, the lead shielded G-M tube 18 continues to only detect gamma radiation even when under the influence of neutrons. The silver shielded G-M tube 16, however, detects both gamma and beta radiation when neutrons are present in the gamma ray field. Therefore, there is an increase in the signal of the silver shielded G-M tube 16 that is absent in the lead shielded G-M tube 18. Typically, the increase in the silver shielded G-M tube 16 due to the beta radiation is substantial. Further, the increase in the value of the subtraction signal is substantial as the increase in the subtraction signal and in the silver shielded G-M tube signal are directly proportional. This is true because the subtraction of the lead shielded G-M tube signal only serves to cancel that part of the silver shielded G-M tube signal that results from gamma radiation. Thus, when the value of the subtraction signal increases, it is a result of detected beta radiation emitted by the silver foil 40 that activates in the presence of neutrons. With the increase in the subtraction signal, the indicator means 48 of correlating unit 14, such as a meter or lamp, is activated to inform the operator of the presence of neutrons, and in turn, spent reactor fuel.

Since neutron presence is determined by an increase in the subtraction or differential signal from a base line value where no beta radiation is being emitted by the silver foil 40 or detected by the G-M tube 16, the half life of the activated foil surrounding the G-M tube 16 is of critical importance for determining how often the presence of neutrons may be accurately monitored with the present detector. Advantageously, the activated silver has a relatively short half life providing approximately 10 minutes of beta emission once the source of neutrons is removed. Consequently, silver is preferred as it allows reliable monitoring of the presence of neutrons at relatively short intervals.

From the above description, the manner of use of the improved detecting apparatus 10 to monitor or track spent nuclear fuel passing through a water filled basin (not shown) can be realized. The fuel rod passes close to the transducer unit 12 causing the differential signal to be generated with the operator receiving a visual indication through the indicator means 48. If desired, a series of detectors of the present invention are located underwater at different positions within a fuel transfer basin. This provides an extended indication of the movement of spent reactor fuel across the entire basin.

As should be appreciated from above, the method of the present invention includes the step of shielding the first G-M tube 16 with silver foil 40. The silver foil 40 activates under the influence of neutrons and begins emitting beta radiation that is detected by the tube 16.

The G-M tube 16 is used in the method for sensing both the gamma radiation of the environment and the beta radiation emitted by the silver foil 40 when it is activated by impinging neutrons. The second G-M tube 18, however, is only used in sensing the gamma radiation of the environment.

The final step of the method involves correlating the amount of radiation impinging on the two G-M tubes 16, 18 so as to distinguish between neutron and gamma radiation.

In summary, numerous benefits have been described which result from employing the concepts of the present invention. The method and apparatus provide a reliable and inexpensive means for distinguishing between neutron and gamma radiation so as to allow detection and tracking of spent reactor fuel movement in an underwater fuel basin. The method does not involve scintillation and, therefore, the apparatus does not require the use of expensive photomultiplier tubes as in the prior art.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An apparatus for distinguishing between neutron and gamma radiation to detect the presence of spent reactor fuel comprising:

first sensing means for detecting gamma and beta radiation;

first shielding means shielding said first sensing means from a portion of impinging gamma radiation and activating under the influence of neutrons to emit beta radiation, whereby said first sensing means senses both gamma and beta radiation when the apparatus is in the presense of gamma radiation and neutrons;

second sensing means for detecting gamma radiation;

second shielding means, comprising a foil, for shielding said second sensing means from a portion of impinging gamma radiation and not activating under the influence of neutrons to emit beta radiation, whereby said second sensing means senses only gamma radiation when the apparatus is in the presence of gamma radiation and neutrons;

means for correlating the amount of radiation impinging on said first and second sensing means so as to distinguish between neutron and gamma radiation.

2. The apparatus disclosed in claim 1, wherein said first and second sensing means are of the Geiger-Mueller type.

3. The apparatus disclosed in claim 1, wherein said first and second shielding means comprise dissimilar metallic foils enveloping said first and second sensing means.

4. The apparatus disclosed in claim 3, wherein said first shielding means comprises silver foil and said second shielding means comprises lead foil, said silver foil generating the beta radiation upon activation by neutrons for detection by said first sensing means.

5. The apparatus disclosed in claim 4, wherein said foils are substantially 10 mil thick.

6. The apparatus disclosed in claim 1, wherein said apparatus further includes a support means for retaining said first and second sensing means in adjacent positions and a third shielding means between said first and second sensing means for shielding said second sensing means from beta radiation when said first shielding means is activated.

7. The apparatus of claim 6, wherein said third shielding means is made of aluminum.

8. The apparatus of claim 1, wherein said correlating means includes a comparator to differentiate between the electrical signal from said first and second sensing means.

9. A method for distinguishing between neutron and gamma radiation to detect the presence of spent reactor fuel comprising the steps of:

shielding a first sensing means with a material that blocks a portion of impinging gamma radiation and activates under the influence of neutrons to emit beta radiation;

sensing the presence of gamma and beta radiation with said first sensing means;

shielding a second sensing means with a foil material that blocks a portion of impinging gamma radiation and does not activate under the influence of neutrons to emit beta radiation;

sensing the presence of gamma radiation only with said second sensing means; and correlating the amount of radiation impinging on said first and second sensing means so as to distinguish between neutron and gamma radiation.

* * * * *